Patented Apr. 13, 1954

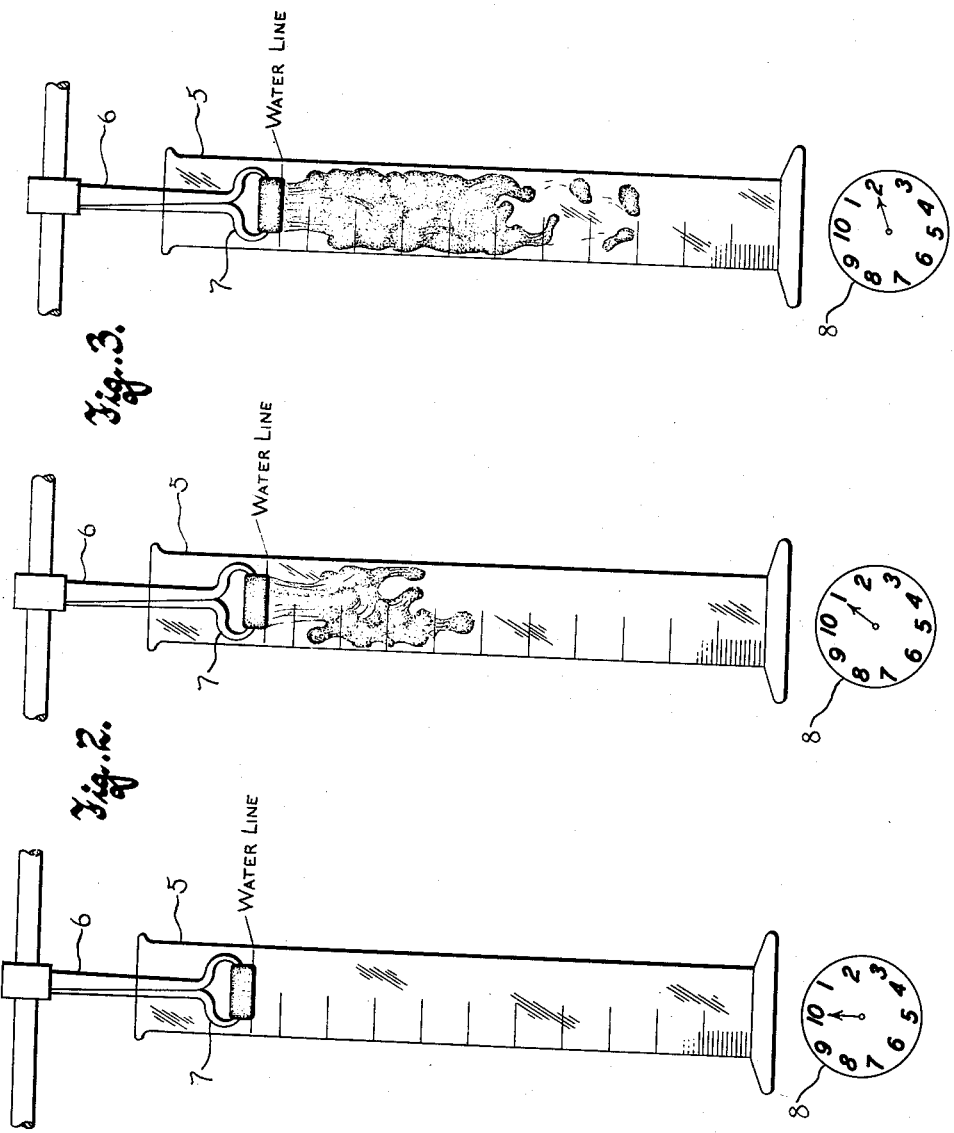

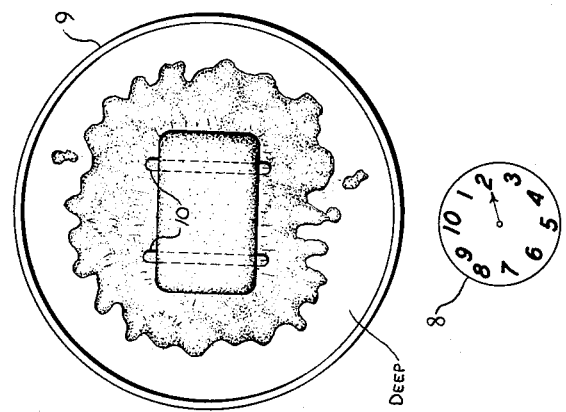
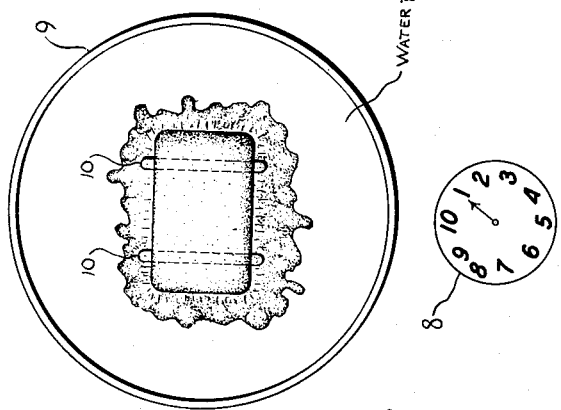
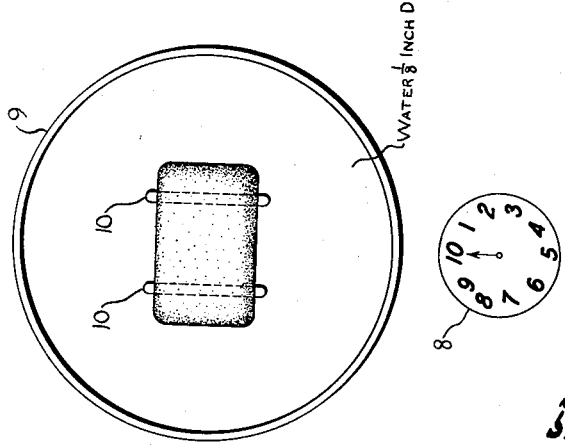

2,674,889

UNITED STATES PATENT OFFICE 2,674,889

METHOD OF TESTING THE SOLUBILITY OF BAR SOAP

Frederick Leslie Toof, Minneapolis, Minn., assignor to Micro Processing Equipment Inc., Des Plaines, Ill., a corporation of Illinois Application February 14, 1952, Serial No. 271,489

1 Claim. (Cl. 73—432)

This invention relates to the art of soap making and has as its purpose to provide a method of quickly and reliably determining the solubility of bar soaps.

Heretofore no satisfactory method was known by which the solubility or lathering properties of bar soap could be quickly and reliably ascertained. Such tests which involve rubbing the bars under water with mechanisms by which the degree of rub can be regulated, and then analyzing the water for soap content are unreliable and not reproducible. Soap suds represent a very large volume of very small amounts of soap. Hence, the lather itself must be measured if lathering ability is to be accurately determined.

Soap solutions are most accurately measured by the so-called pour test which develops a foam and in which the foam thus produced is measured. But this solution test is not a satisfactory method of ascertaining the solubility of bar soap.

The present invention involves a technique which achieves the advantages of the pour test for soap solutions but without need for rubbing the bar or pouring a controlled stream of water over the bar, and in addition provides a method of quickly measuring the solubility of a bar or cake of soap which is reproducible and reliably accurate.

Thus, with this objective in view, this invention resides in the unique method substantially as hereinafter described and more particularly defined by the appended claim, it being understood that such changes in the precise embodiment of the hereindisclosed invention may be made as come within the scope of the claim.

Generally stated, this invention consists in immersing or partially immersing the bar or cake of soap to be tested in a bath of hard, still water in such a way that the precipitate cloud which forms as a result of such contact between the soap and the water can be observed and measured. The cloud, of course, is simply the insoluble calcium and magnesium soaps formed by the combination of the dissolved soap with the hard water. The size and rate of migration of this precipitate cloud can be measured in various ways.

Two different ways of practicing the invention are illustrated in the accompanying drawings, in which:

Figures 1 to 3, inclusive, depict what may be referred to as the vertical method; and Figures 4 to 6, inclusive, illustrate an alternate or horizontal method.

The method illustrated in Figures 1 to 3, inclusive, consists in very nearly filling a tall graduated transparent tubular vessel 5 with hard water. The water should have a hardness of 150—300 parts of solids per million. Then by means of a suitable adjustable supporting structure 6 and clamp 7 the bar or cake of soap to be tested is carefully lowered into the water about $\frac{1}{16}$ of an inch, care being taken that the underside of the bar is horizontal and that the stillness of the water is not disturbed. The instant this immersion is made a time clock 8 is started. Within a very short time, a matter of seconds for a bar having good solubility, a precipitate cloud of calcium and magnesium soaps will form below the bar. The nature of this cloud and its rate of downward migration can be studied and measured. The progression or growth of this cloud formation is depicted in Figures 2 and 3 since Figure 1 shows the conditions at the start of the test. In actual practice it is best to take photographs of the test setup every few minutes. This will provide a running record of the test and enable studied comparison of the test results with a predetermined standard photographically recorded in the same way and under identical conditions.

It is, of course, to be understood that Figures 2 and 3 are but illustrative of the series of photographs that would be taken in making a complete test. However, these figures are quite faithful reproductions of actual photographs taken one minute and two minutes after the start of a test conducted upon a bar of soap of the type covered in the copending application of Donald E. Marshall, Serial Number 129,942, now Patent Number 2,619,680.

Not only is the rate of travel or migration of the precipitate cloud a measure of the solubility of the soap bar being tested, but in addition its density (i. e., its opacity) and character affords an indication of the richness of the lather. A thin coconut oil soap type of lather forms a very transparent thin cloud, whereas a tallow soap or other high titre soap will form a denser cloud.

Since even poorly lathering soaps form an appreciable cloud in a matter of minutes, the test is very quick and accurately reproducible if the conditions, i. e. hardness of the water, extent of immersion, etc., are the same for the successive tests.

Also, by using duplicate water baths and simultaneously immersing two bars into these baths to the same extent, a visual comparison, capable of being photographically recorded, either by a series of still shots or by moving pictures, can be had of the solubility or lathering ability of two bars. Such a comparative test graphically illustrates the superior lathering properties of the soap described in the aforesaid copending application over those of conventional roller milled soap.

The other way of practicing the method illustrated in Figures 4, 5 and 6 consists in filling the bottom of a glass or plastic tray 9 with hard water to a depth of ⅛ inch. The tray should have an area of at least one square foot. In the center of the tray two 1/16 inch diameter glass rods 10 are placed side-by-side. These rods serve as rails upon which the bar or cake to be tested is placed. This immerses the bar 1/16 inch. After one or two minutes a cloud will form around the bar or cake which migrates slowly outwardly. During a period of fifteen minutes or thereabouts the size of the cloud can be periodically measured, or its growth may be photographically recorded for comparison with the cloud migration of another bar recorded under the same conditions. If the water is at room temperature and the bar dry before starting the test, conditions very close to wash stand performance are had.

From the foregoing description taken in connection with the accompanying drawings, it will be readily apparent to those skilled in the art that this invention for the first time provides the soap industry with an accurate, quick and reliable method of ascertaining the solubility of bar soaps.

What I claim as my invention is:

The method of testing a bar of soap to determine its lathering properties, which is characterized by the steps of: holding a bar of soap to be tested with one substantially flat surface thereof in contact with still water of predetermined hardness, the soap being only very slightly immersed in the water and said flat surface having a predetermined area; and, after a predetermined time of immersion, measuring the size and opacity of the precipitate cloud which forms as a result of such immersion, for the purpose of comparison with the same characteristics of the precipitate cloud from a bar of soap of known properties having a surface of similar area similarly immersed in water of the same hardness for the same period of time.

References Cited in the file of this patent

UNITED STATES PATENTS

| Number | Name | Date |
|---|---|---|
| 2,122,824 | Pick | July 5, 1938 |
| 2,248,765 | Langlier | July 8, 1941 |